United States Patent
Kojima et al.

(10) Patent No.: US 8,307,633 B2
(45) Date of Patent: Nov. 13, 2012

(54) ENGINE EXHAUST GAS PURIFICATION APPARATUS ENABLING ACCURATE JUDGEMENT OF APPROPRIATE TIME FOR TERMINATING NOX CATALYST REGENERATION PROCEDURE

(75) Inventors: Kazuo Kojima, Nagoya (JP); Shoichi Yokoyama, Utsunomiya (JP)

(73) Assignee: Denso Corporation, Kariya (JP)

( * ) Notice: Subject to any disclaimer, the term of this patent is extended or adjusted under 35 U.S.C. 154(b) by 829 days.

(21) Appl. No.: 12/177,911

(22) Filed: Jul. 23, 2008

(65) Prior Publication Data
US 2009/0049824 A1    Feb. 26, 2009

(30) Foreign Application Priority Data
Aug. 21, 2007    (JP) ................................ 2007-214592

(51) Int. Cl.
*F01N 3/20*    (2006.01)
(52) U.S. Cl. .......................................... 60/286; 60/295
(58) Field of Classification Search .................. 60/285, 60/286, 295, 303, 297
See application file for complete search history.

(56) References Cited

U.S. PATENT DOCUMENTS

| | | | |
|---|---|---|---|
| 2004/0154285 A1* | 8/2004 | Nagaoka et al. | 60/285 |
| 2006/0137329 A1* | 6/2006 | Lowe et al. | 60/286 |
| 2008/0028749 A1 | 2/2008 | Haga et al. | |
| 2009/0077947 A1* | 3/2009 | Nagaoka et al. | 60/284 |

FOREIGN PATENT DOCUMENTS

| | | | |
|---|---|---|---|
| JP | 08121218 A | * | 5/1996 |
| JP | 2004-232576 | | 8/2004 |
| JP | 2006161668 A | * | 6/2006 |
| JP | 2007-187146 | | 7/2007 |

OTHER PUBLICATIONS

Office Action (2 pgs.) dated Dec. 1, 2011 issued in corresponding Japanese Application No. 2007-214592 with an at least partial English-language translation thereof. (3 pgs.).

* cited by examiner

*Primary Examiner* — Thomas Denion
*Assistant Examiner* — Jonathan Matthias
(74) *Attorney, Agent, or Firm* — Nixon & Vanderhye P.C.

(57) ABSTRACT

In an engine exhaust gas purification apparatus incorporating a LNT (lean NOx trap), during a NOx catalyst regeneration procedure for deoxidizing and removing accumulated sulfur from the LNT by producing a fuel-rich atmosphere in the exhaust system, the point at which to terminate the regeneration procedure is judged based on a difference between values of A/F ratio measured by sensors located respectively upstream and downstream from the LNT, with the regeneration being terminated when the difference falls below a predetermined threshold value.

25 Claims, 9 Drawing Sheets

ENGINE EXHAUST GAS PURIFICATION APPARATUS ENABLING ACCURATE JUDGEMENT OF APPROPRIATE TIME FOR TERMINATING NOX CATALYST REGENERATION PROCEDURE

CROSS-REFERENCE TO RELATED APPLICATIONS

This application is based on and incorporates herein by reference Japanese Patent Application No. 2007-214592 filed on Aug. 21, 2007.

BACKGROUND OF THE INVENTION

1. Field of Application

The present invention relates to an exhaust gas purification apparatus for an internal combustion engine. In particular, the invention relates to an engine exhaust gas purification apparatus in which a NOx catalyst in the exhaust system can be regenerated by temporarily establishing a fuel-rich condition of the exhaust gas.

2. Description of Related Art

In recent years, with increasing importance being placed on environmental protection, it has become essential to achieve effective purification of the exhaust gases emitted from the engines of motor vehicles.

In particular in the case of a diesel engine, it is necessary to effectively remove nitrous oxides (NOx) from the exhaust gas. Generally, this is performed by means of a LNT (lean NOx trap) installed at a position along the exhaust gas flow path, which utilizes a catalyst to adsorb and reduce (i.e., deoxidize) the NOx.

Such a LNT traps (adsorbs) the NOx while the diesel engine is operating in a fuel-lean exhaust gas condition i.e., a normal condition in which the exhaust gas has a high concentration of oxygen. When the exhaust gas subsequently is changed from the lean condition to a rich (i.e., fuel-rich) condition, with a low concentration of oxygen, the NOx that has been adsorbed by the LNT become reduced (deoxidized) by the fuel components in the exhaust gas, leaving nitrogen to be emitted from the exhaust system as a harmless gas. An LNT generally utilizes a material such as barium for adsorbing the NOx.

However with such a type of LNT, the agent used to adsorb the NOx combines with sulfur compounds in the fuel, resulting in a phenomenon referred to as sulfur poisoning. The performance of the LNT in adsorbing NOx is thereby lowered. In order to regenerate the LNT when this sulfur poisoning reaches an advanced state, it is necessary to temporarily establish a high-temperature (e.g., 650° C. or more), fuel-rich condition of the exhaust gas.

However fuel is wasted, when operating the engine to produce a fuel-rich exhaust gas in order to effect regeneration from sulfur poisoning. In particular, in the case of a diesel engine, the exhaust gas temperature is normally low. Thus, during each LNT regenerative operation, it is necessary to expend a large amount of fuel in order to maintain a sufficiently high temperature of exhaust gas until the regeneration procedure has been completed. It is therefore desirable to be able to accurately judge the point of completion of such a LNT regeneration procedure i.e., to judge the time point at which the regeneration procedure can be terminated. If that termination point can be accurately judged, then the amount of fuel consumed in each regeneration procedure can be minimized.

A method of judging such a termination point for sulfur poisoning regeneration is described for example in Japanese patent publication No. 2004-232576. With that method, applied to a system in which a fuel addition valve is controlled to inject fuel into the exhaust gas (i.e., for establishing a high-temperature fuel-rich atmosphere during sulfur poisoning regeneration), peak values of air/fuel ratio that are detected by an air/fuel ratio sensor (located downstream from the LNT catalyst) are applied in feedback control of the fuel addition valve. In that way, the volumetric rate at which fuel is injected by the valve becomes successively reduced as the sulfur poisoning regeneration process advances. When the rate falls below a predetermined value, the regeneration procedure is terminated.

However with the technique described in the above patent, it is difficult to directly measure the volumetric rate at which fuel is being injected by the fuel addition valve, so that it is necessary to estimate this based on command values of the volumetric rate. However due to deviations between the characteristics of respective fuel injection valve units, and deterioration of such a fuel injection valve over a period of time, etc., discrepancies will arise between the command values of volumetric rate and the actual rates at which fuel is added. Hence, the judgement accuracy will deteriorate.

If the time point for termination of sulfur poisoning regeneration procedure could be derived based on direct measurement, then greater accuracy of judgement could be achieved.

SUMMARY OF THE INVENTION

It is an objective of the present invention to overcome the above problem, by providing an exhaust gas purification apparatus for an internal combustion engine whereby a time point for termination of regeneration of a NOx catalyst from sulfur poisoning regeneration can be accurately judged by using information obtained from direct measurements relating to the NOx catalyst.

To achieve this, according to a first aspect, the invention provides an exhaust gas purification apparatus comprising a NOx (nitrous oxides) catalyst device installed in an exhaust passage of an internal combustion engine for deoxidizing NOx contained in exhaust gas of the engine, catalyst regeneration means, and control circuitry for controlling the catalyst regeneration means to execute regeneration of the NOx catalyst device from sulfur poisoning by setting the A/F (air-to-fuel) ratio of the exhaust gas at a value lower than a stoichiometric A/F ratio. The apparatus further comprises an upstream A/F ratio sensor for obtaining measured values of A/F ratio of the exhaust gas (i.e., located in the exhaust gas passage, upstream from the NOx catalyst device), and a downstream A/F ratio sensor for similarly obtaining measured values of A/F ratio. The apparatus is characterized in that, while regeneration is in progress, the control circuitry repetitively performs a sequence of operations of:

acquiring respective measured values of A/F ratio from the downstream A/F ratio sensor and the upstream A/F ratio sensor, calculating the difference between the respective A/F ratio values obtained by the upstream and downstream A/F ratio sensors, comparing the difference with a predetermined value, and terminating the regeneration if the difference is judged to be less than that value.

In that way it becomes possible to judge the time point at which catalyst regeneration is to be terminated, with the judgement being performed based upon information obtained by direct measurement. Specifically, by monitoring the difference between A/F ratio values that are measured by an upstream-side A/F ratio sensor and a downstream-side A/F ratio sensor respectively (i.e., a difference that decreases in accordance with increased deoxidation of sulfur oxides that have accumulated in the interior of a LNT which is located between the upstream and downstream A/F ratio sensors), accurate judgement can be achieved.

Such an apparatus preferably also comprises an oxidizing catalyst that is located upstream from the upstream A/F ratio sensor. HC (hydrocarbons), which are difficult to detect using an A/F ratio sensor, will thereby be oxidized to CO (carbon monoxide) before reaching the A/F ratio sensors. Thus, the reliability of the measurements obtained from the A/F ratio sensors can be increased, so that the time point for terminating the catalyst regeneration from sulfur poisoning can be more accurately judged.

Preferably, such an apparatus includes means for acquiring the temperature of the catalyst having an oxidizing function which is located upstream from the upstream A/F ratio sensor, and the control circuitry is configured to calculate the difference between respective A/F ratio values from the upstream A/F ratio sensor and the downstream A/F ratio sensor only if the temperature exceeds a predetermined threshold value.

It thereby becomes possible to avoid problems which occur when the temperature of that catalyst is excessively low, causing insufficient oxidation of exhaust gas, thereby resulting in lower reliability of the measured values obtained from the A/F ratio sensors. This further enables the time point for terminating catalyst regeneration from sulfur poisoning to be more accurately judged.

Catalyst regeneration is controlled by adding a specific quantity of fuel to said exhaust gas, to produce a high-temperature, fuel-rich condition of said exhaust gas. This can be done through controlling the engine injectors to perform post-injection of a specific quantity of fuel into each cylinder after combustion has occurred in a combustion stroke. However preferably a dedicated device (fuel addition valve) is utilized, which is controlled to add a specific amount of fuel to the exhaust gas flow, at a position upstream from the A/F ratio sensors. In either case, the control circuitry (in general, an engine ECU) is preferably configured to adjust said specific quantity in a direction for bringing values of A/F ratio obtained by said upstream A/F ratio sensor close to a target value of A/F ratio.

The apparatus may further include means for acquiring the temperature of the exhaust gas and supplying the temperature information to the control circuitry, with the control circuitry being configured such that:

when the exhaust gas temperature exceeds a predetermined threshold value of temperature, the aforementioned specific quantity of added fuel is adjusted in a direction whereby values of A/F ratio obtained by the upstream A/F ratio sensor become close to a first target value, and when the exhaust gas temperature is less than the predetermined threshold value, the specific quantity is adjusted in a direction whereby values of A/F ratio obtained by the downstream A/F ratio sensor become close to a second target value.

Alternatively, the apparatus can comprise means for acquiring the flow rate of the exhaust gas, with the control circuitry being configured such that:

when the flow rate is less than a predetermined threshold value of flow rate, the aforementioned specific quantity of added fuel is adjusted in a direction whereby the values of A/F ratio obtained by the upstream A/F ratio sensor become close to a first target value, and when the flow rate value is greater than the threshold value, the specific quantity is adjusted in a direction whereby values of A/F ratio obtained by the downstream A/F ratio sensor become close to a second target value.

In that way, when the exhaust gas flow rate is low, so that the measured values from the upstream-side A/F ratio sensor have high reliability, the rate of added fuel (for increasing the exhaust gas temperature) is adjusted such as to make the measured values from the upstream-side A/F ratio sensor attain a target value. When the exhaust gas flow rate is high, so that the measured values from the upstream-side A/F ratio sensor have low reliability, an increased rate of reaction occurs for the NOx catalyst, so that the reliability of the measured values from the downstream-side A/F ratio sensor will be relatively increased. In that case the rate of added fuel is adjusted to make the measured values from the downstream-side A/F ratio sensor attain a target value. Thus, the time point for terminating catalyst regeneration from sulfur poisoning can be more accurately judged.

The catalyst having an oxidizing function can be implemented by combining an oxidation catalyst with a particulate filter. A single unit which is located upstream from the LNT can thereby serve both as an oxidation catalyst and also as a DPF (diesel particulate filter). Hence the overall apparatus can be made more compact than is possible when using an oxidation catalyst and DPF that are respectively separate units, while ensuring more accurate judgement of the point at which catalyst regeneration from sulfur poisoning is to be terminated.

From another aspect, the apparatus of the first aspect may be configured such that the control circuitry receives information expressing operating parameters of the internal combustion engine, including cumulative amounts of fuel consumed by the engine. The control circuitry includes a memory having data stored therein which express an estimation model (i.e., a mathematical model), which is used in conjunction with the engine operating parameter information to estimate a residual amount of sulfur contained in the NOx catalyst device. The control circuitry is configured to compare the difference between respective A/F ratio values obtained from the upstream and downstream A/F ratio sensors with a predetermined threshold value of A/F ratio, as a first judgement operation. If the difference between the respective A/F ratio values is found to exceed the first predetermined value, the estimation model is used to estimate the residual amount of sulfur within the NOx catalyst device. As a second judgement operation, that estimated amount is then compared with a predetermined threshold value, and the regeneration procedure is terminated if the estimated amount is less than the threshold value.

In that way, even if one or both of the upstream and downstream A/F ratio sensors becomes defective so that the time point for terminating the regeneration cannot be accurately judged based on the difference between the respective values obtained from these sensors, it can be ensured that regeneration will not continued for an excessive duration. This is due to the fact that estimated values obtained using the estimation model can be utilized in the second judgement operation.

From another aspect of the invention, the aforementioned difference is preferably obtained between respective values from the upstream and downstream A/F ratio sensors which are acquired after a specific amount of delay has elapsed following the commencement of a regeneration procedure, i.e., following the point at which the proportion of fuel in the exhaust gas begins to be increased in order to bring the A/F ratio below the stoichiometric A/F ratio value. This delay serves to ensure that the A/F ratio values are acquired (for use in judging whether catalyst regeneration is to be terminated)

only after deoxidation of the sulfur compounds in the NOx catalyst has actually commenced.

From another aspect of the invention, instead of simply obtaining the difference between respective single A/F ratio values obtained from the upstream and downstream A/F ratio sensors, preferably a plurality of successive sample values of upstream A/F ratio and plurality of successive sample values of downstream A/F ratio are acquired, and are used (e.g., by averaging) to obtain a representative upstream A/F ratio and a representative downstream A/F ratio. The difference between these representative values is then used to judge whether the catalyst regeneration is to be terminated.

Acquisition of these sample values is preferably commenced after an appropriate delay following the start of a regeneration procedure, e.g., with acquisition of the upstream A/F ratio sample values being commenced after a fixed delay following the point at which the measured upstream A/F ratio falls below the stoichiometric value, and similarly with acquisition of the downstream A/F ratio sample values being commenced after a fixed delay following the point at which the measured downstream A/F ratio falls below the stoichiometric value.

DESCRIPTION OF PREFERRED EMBODIMENTS

Figure 1:
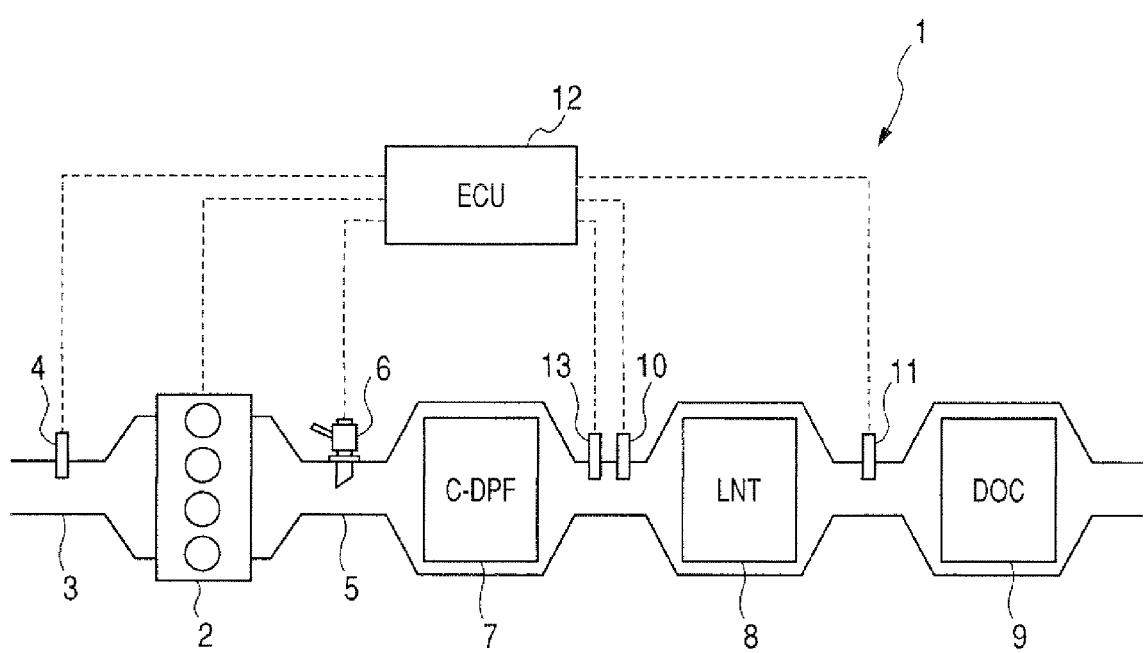
FIG. 1 conceptually illustrates an example of the overall configuration of an exhaust gas purification apparatus of an internal combustion engine.

FIG. 1 conceptually illustrates an exhaust system of an internal combustion engine, for use in describing an embodiment of an exhaust gas purification apparatus, designated by numeral 1.

The exhaust gas purification apparatus 1 operates with a 4-cylinder diesel engine 2 (referred to in the following simply as the engine), which receives a flow of intake air through an intake manifold 3. Exhaust gas from the engine 2 passes out via an exhaust passage 5 of the exhaust gas system. An ECU 12 performs overall control of the operation of the exhaust gas purification apparatus 1, in addition to controlling fuel injection for the engine 2. The intake manifold 3 has an air flow meter 4 installed, for measuring the air intake rate of the engine 2. The exhaust passage 5 is provided with a fuel addition valve 6, which is controlled by commands from the ECU 12 for adding fuel to the exhaust passage 5 (i.e., injecting a specific amount of fuel into the exhaust passage 5 at each of specific time points), for producing a fuel-rich atmosphere within the exhaust passage 5.

As shown in FIG. 1, the system includes a C-DPF 7 which is a DPF (diesel particulate filter) provided with an oxidization catalyst, a LNT (lean NOx trap) 8 which contains a NOx adsorbing and deoxidation catalyst, and a DOC (diesel oxidation catalyst) 9. As shown, the C-DPF 7, the LNT 8 and the DOC 9 are disposed successively along the exhaust passage 5 of the exhaust system, from the upstream end of the exhaust passage 5.

Typically, the C-DPF 7 has a honeycomb configuration in which intake passages and outflow passages are alternately blocked. While the engine 2 is running, exhaust gas from the engine contains particulate matter (abbreviated to PM in the following) which collects on the surface of a filter wall in the C-DPF 7, as the exhaust gas passes through the filter wall, and the filter wall is formed as an oxidation catalyst. Oxidation reaction thereby occurs between the catalyst and components of the exhaust gas, or with fuel that is added to the exhaust gas flow by the fuel addition valve 6.

The LNT 8 can for example be formed with a plurality of passages in its interior, with the walls of the passages being provided with an adsorbent agent for adsorbing NOx and for also functioning as a catalyst for subsequent deoxidation of the adsorbed NOx. While the exhaust gas is in a (normal) fuel-lean condition, NOx in the exhaust gas is adsorbed, i.e., is trapped within the LNT 8. When regeneration of the LNT 8 becomes necessary, fuel is injected into the exhaust gas flow, by the fuel addition valve 6 to produce a low-oxygen (fuel-rich) condition of the exhaust gas that flows into the LNT 8. The trapped NOx is thereby deoxidized, so that nitrogen flows out of the exhaust system in place of the NOx, thereby purifying the exhaust gas.

Also as shown, an upstream A/F sensor 10 and a downstream A/F sensor 11 are respectively disposed upstream and downstream from the LNT 8, along the exhaust passage 5. The measured A/F ratio values obtained by these sensors are supplied to the ECU 12. An exhaust temperature sensor 13 is also installed in the exhaust passage 5, immediately downstream from the C-DPF 7, and measured values of exhaust gas temperature that are obtained by the exhaust temperature sensor 13 are supplied to the ECU 12.

When the exhaust gas is made fuel-rich by addition of fuel from the fuel addition valve 6, the trapped NOx within the LNT 8 becomes deoxidized as described above, i.e., by the hydrocarbons (HC) and carbon monoxide (CO) in the exhaust gas. However the HC and CO may not be completely dissipated by this deoxidation process. Hence, the DOC 9 is provided to cleanse the exhaust gas by oxidizing any residual CO or HC which pass out from the LNT 8.

Figure 5:
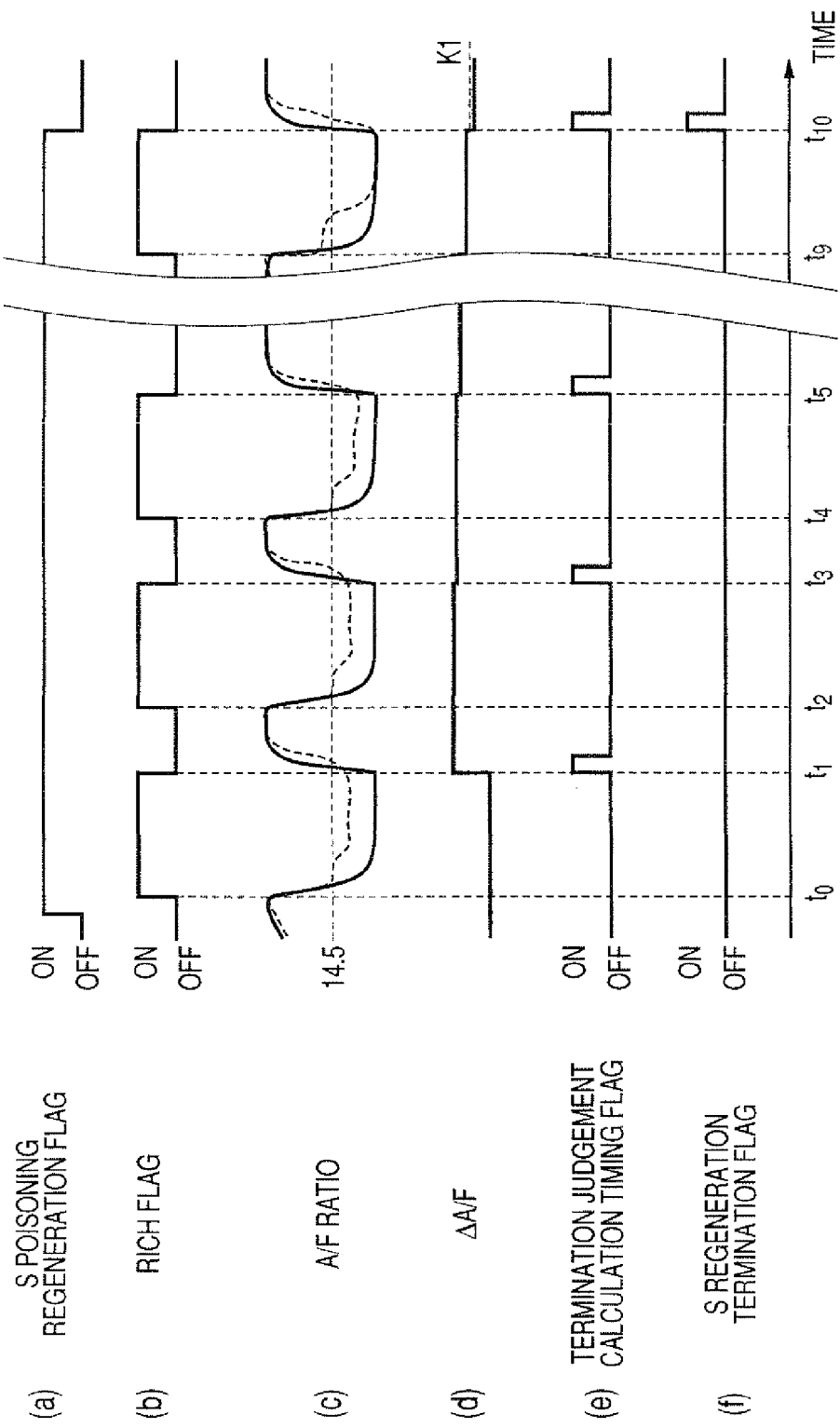
FIG. 5 is a timing diagram illustrating time axis variations of parameters including measured A/F ratio values, during a sulfur poisoning regeneration procedure.

FIG. 5 shows an example of a timing diagram of regeneration of the LNT 8 from sulfur poisoning, with this embodiment. For brevity of description, the operations performed for regeneration of the LNT 8 from poisoning by sulfur compounds will be referred to collectively as "S poisoning regeneration" in the following. Section (a) of FIG. 5 illustrates changes in the state of a flag (i.e., a 1-bit control variable, used in processing by the ECU 12) designated as the S poisoning regeneration flag. This is set to the ON state when S poisoning regeneration is to be initiated and set to the OFF state when the regeneration procedure is ended. Hence it is normally held in the OFF state.

During S poisoning regeneration, fuel is injected into the exhaust passage 5 from the fuel addition valve 6 such as to create a sufficiently fuel-rich atmosphere and sufficiently high temperature for effecting regeneration of the LNT 8, i.e., by deoxidizing the sulfur compounds trapped in the LNT 8 as described above.

The system may be configured such that, following each S poisoning regeneration procedure, the cumulative amount of fuel that is consumed by the engine thereafter is measured, and the S poisoning regeneration flag is set to the ON state when the cumulative amount of consumed fuel reaches a predetermined value. Alternatively, it would be possible to estimate the amount of sulfur that has accumulated within the LNT 8 based upon distance traveled by the vehicle (i.e., after completion of an S poisoning regeneration procedure), and set the S poisoning regeneration flag to the ON state when the estimated amount of accumulated sulfur reaches a predetermined value.

As a further alternative, it would be possible to incorporate a NOx sensor for use in directly judging the degree of deterioration of the LNT 8, with the S poisoning regeneration flag being set to the ON state when it is judged that the deterioration has reached a predetermined degree.

As another alternative, it is possible to judge the degree of deterioration of the NOx adsorption performance of the LNT 8 based on an estimated amount of NOx adsorbed in the LNT 8, as indicated by an estimated amount of oxidizing agent of the LNT 8 that has been consumed during a NOx deoxidation reduction operation (i.e., an amount which will no longer be functioning, until the next regeneration procedure has been executed). The amount of oxidizing agent that is consumed can be obtained for example by taking A/F ratio measurements during NOx deoxidation operation. In that case, the S poisoning regeneration flag can be set to the ON state when the NOx adsorption performance of the LNT 8 is estimated to have deteriorated to a predetermined extent.

While a S poisoning regeneration procedure is being executed, a flag referred to as the "rich flag" is alternately set to the ON and OFF states. During each interval in which the rich flag is in the ON state (such an interval being referred to as a "rich interval" in the following), the fuel addition valve 6 injects fuel into the exhaust passage 5 in response to a command issued from the ECU 12, to establish a fuel-rich atmosphere as described above. Each interval in which the rich flag is in the OFF state is referred to as a "lean interval" in the following.

It should be noted that it would be equally possible to establish such a fuel-rich atmosphere in the exhaust passage 5 upstream from the LNT 8 by injecting fuel into each cylinder of the engine 2 during each combustion stroke, following completion of the combustion reaction within the cylinder, that is to say, post-injection of fuel into the cylinders. Alternatively, a similar effect can be achieved by temporarily reducing the rate of air intake of the engine 2, thereby making the exhaust gas fuel-rich by producing a rich combustion condition of the engine.

However the method of this embodiment whereby fuel is injected into the exhaust passage 5 by the fuel addition valve 6 has the advantage of being easy to control, and does not cause problems such as thinning of engine oil.

Section (b) of FIG. 5 shows an example of changes in the state of the rich flag with time. The reason for establishing lean intervals and rich intervals in successive alternation is that the temperature of the catalyst in the LNT 8 can be adjusted by altering the duration of each lean interval. That is to say, as the lean intervals are made shorter, the amount of fuel consumed per unit time interval is increased accordingly, so that the catalyst temperature rises. Conversely, as the lean intervals are made longer, the catalyst temperature decreases accordingly.

In section (c) of FIG. 5, measured A/F ratio values obtained by the upstream A/F sensor 10 are indicated by the full-line portions, and those measured by the downstream A/F sensor 11 are indicated by the broken-line portions. As a general tendency, during each rich interval the measured values obtained by the downstream A/F sensor 11 (downstream from the LNT 8) will be higher than those obtained by the upstream A/F sensor 10 (upstream from the LNT 8). The reason for this is that a part of the fuel constituents are consumed within the LNT 8, in performing S poisoning regeneration.

With the present invention, these measured values obtained by the upstream A/F sensor 10 and the downstream A/F sensor 11 are used in judging the state of advancement of S poisoning regeneration. Specifically, if the difference between the measured values from the upstream A/F sensor 10 and those from the downstream A/F sensor 11 is large, then this is taken to indicate that the state of recovery of the LNT 8 from sulfur poisoning is not yet sufficiently advanced. As the difference becomes smaller, this indicates an increased degree of advancement of recovery from the sulfur poisoning. When the difference falls to a predetermined value, this is judged to indicate that the recovery has been completed, i.e., that the S poisoning regeneration procedure is to be terminated, as described in detail hereinafter.

The difference between respective representative values of sets of measured values obtained from the downstream A/F sensor 11 and the upstream A/F sensor 10 (i.e., with each of the sets of measured values having been obtained within a single rich interval) will be designated as $\Delta A/F$. Methods of obtaining such "representative values" (e.g., as respective average values) are described hereinafter.

Section (d) of FIG. 5 shows an example of changes in the value of $\Delta A/F$. For example, between the time points t1 and t3, the value of $\Delta A/F$ is the difference between respective representative values of measured A/F ratio values that were obtained from the downstream A/F sensor 11 and the upstream A/F sensor 10 during the rich interval from t0 to t1.

Section (e) of FIG. 5 shows the time-axis variations of a flag referred to as the termination judgement calculation timing flag. This flag becomes set to the ON state for a specific duration during each lean interval, as shown. S poisoning regeneration termination judgement processing is executed during each of these intervals in which the termination judgement calculation timing flag is in the ON state, to calculate the value of $\Delta A/F$, as described hereinafter referring to FIGS. 2, 3 and 4.

By making each ON interval of the termination judgement calculation timing flag begin immediately following the end of a rich interval, it becomes possible to speedily judge the point at which the S poisoning regeneration can be terminated.

In this S poisoning termination judgement processing, the value of $\Delta A/F$ is calculated and the calculated value is compared with a predetermined threshold value. If $\Delta A/F$ is found to be less than the threshold value then this is taken as an indication that the S poisoning regeneration is to be terminated. When this occurs, a flag shown in diagram (f), referred to as the S regeneration termination flag, is set to the ON state and the S poisoning regeneration flag is set to the OFF state. The S poisoning regeneration procedure is then ended, and the termination judgement calculation flag is cleared to the OFF state.

Figure 12:
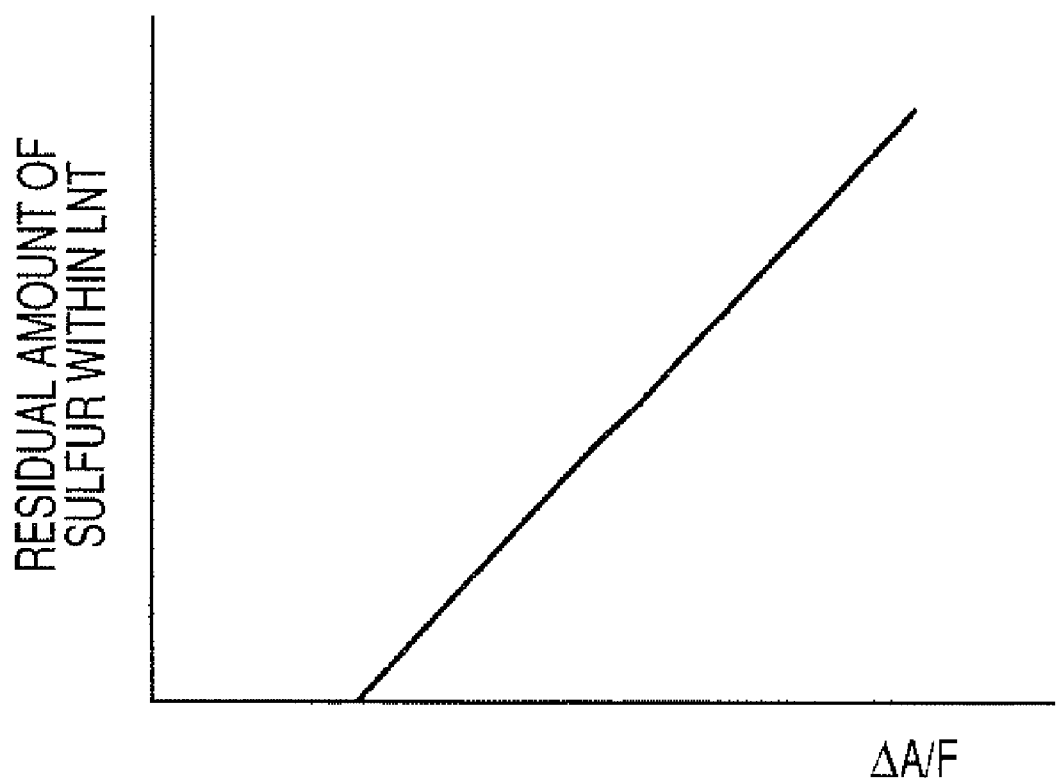
FIG. 12 illustrates a relationship between residual amounts of sulfur within an LNT and values of difference between respective measured values from an upstream A/F ratio sensor and a downstream A/F ratio sensor.

The relationship between the value of $\Delta A/F$ and the amount of sulfur remaining in the interior of the LNT 8 is illustrated in FIG. 12. As shown, there is a basically linear relationship between these. Thus when the value of ΔA/F is measured as described above, not only can the extent of recovery of the LNT 8 from sulfur poisoning be determined, but also the amount of sulfur remaining within the LNT 8 can be estimated.

It should be noted that it is not essential that rich intervals and lean intervals occur in successive alternation during S poisoning regeneration, as in the example of FIG. 5. It would be equally possible to maintain a single continuous rich interval for the duration of each interval in which the S poisoning regeneration flag is ON. In that case, the difference between the respective measured values from the downstream A/F sensor 11 and the upstream A/F sensor 10 would be monitored continuously during that rich interval (i.e., without utilizing representative values). When the difference is judged to exceed a predetermined threshold value, S poisoning regeneration would be terminated.

Figure 2:
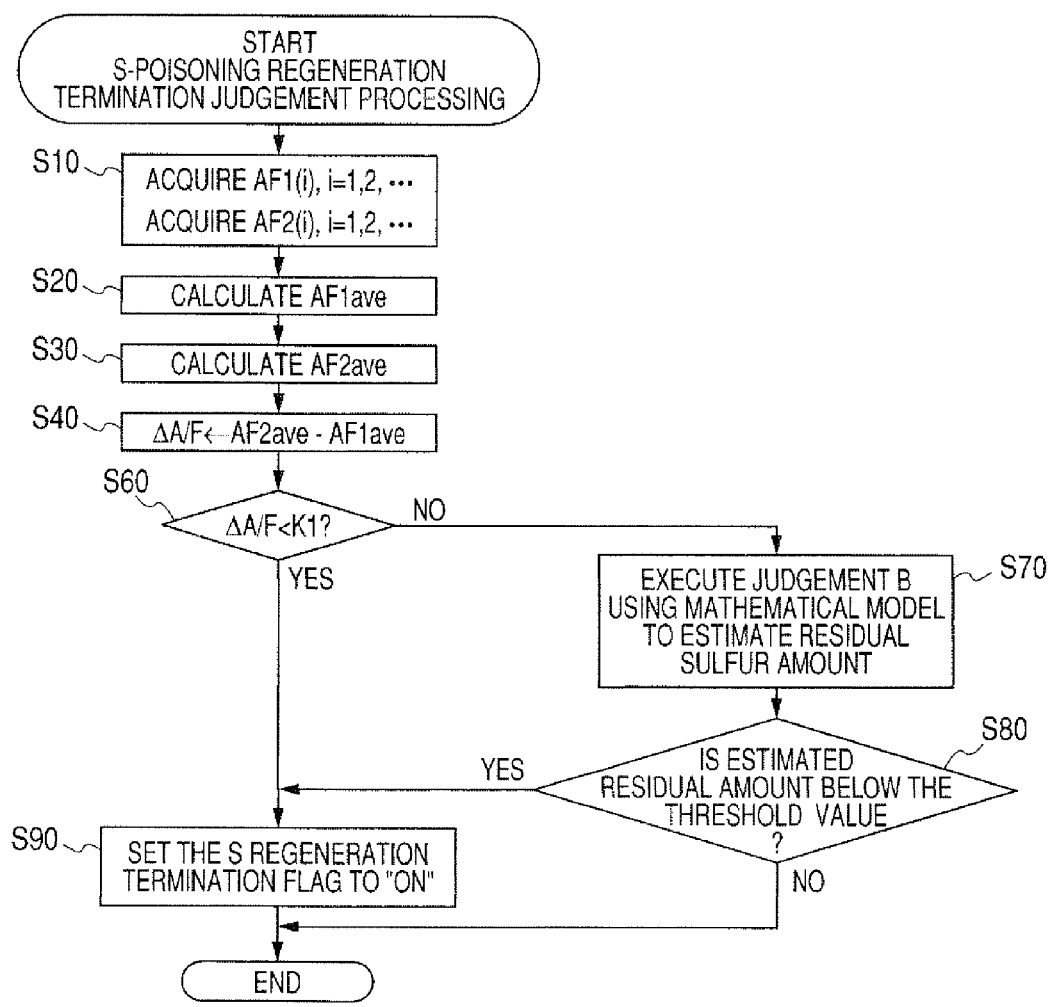
FIG. 2 is a flow diagram of a processing sequence for judging a time point for terminating a sulfur poisoning regeneration procedure, according to a first embodiment of the invention.

FIG. 2 is a flow diagram showing the S poisoning regeneration termination judgement processing routine that is executed by the ECU 12 of this embodiment. While the S poisoning regeneration flag is at the ON state, this processing routine is executed during each ON interval of the termination judgement calculation timing flag (shown in FIG. 5, described above). Firstly, in step S10, a series of A/F ratio values AF1(i) (i=1, 2, 3 . . . ) measured by the upstream A/F sensor 10 are acquired during a single rich interval such as the interval t0 to t1 in FIG. 5, i.e., a specific number of successive measured values. Concurrent with this, a series of A/F ratio values AF2(i) (i=1, 2 . . . ) measured by the upstream A/F sensor 11 are similarly acquired during that rich interval.

Next in step S20, a representative value AF1ave is calculated from the acquired series of A/F ratio values AF1(i) from the upstream A/F sensor 10, as described hereinafter. In step S30, a representative value AF2ave is similarly calculated from the acquired series of A/F ratio values AF2(i) from the downstream A/F sensor 11.

Next (step S40) the difference between the values AF1ave and AF2ave obtained in steps S20 and S30 is calculated, and is stored as the value of the variable ΔA/F. In the next step (S60) a decision is made as to whether ΔA/F exceeds a predetermined value K1. If K1 is exceeded, then operation proceeds to step S90, while otherwise, operation proceeds to step S70.

It is a basic concept of the present invention that, so long as regeneration of the LNT 8 from sulfur poisoning is not sufficiently completed, some of the fuel that is conveyed in the exhaust gas will be used (consumed) within the LNT 8 by the S poisoning regeneration. This causes the value of ΔA/F to be large. Hence, the appropriate time point for terminating the S poisoning regeneration process can be judged based upon the magnitude of ΔA/F, i.e., by determining when ΔA/F has become sufficiently small. If that is found to be the case in step S60, then the S regeneration termination flag is set ON in step S90. In the following, the judgement performed in step S60 will be referred to as "judgement A".

It is possible that one or both of the upstream A/F sensor 10 and downstream A/F sensor 11 may develop a fault. For that reason, when there is a NO decision reached in the judgement step S60, an auxiliary judgement is performed in step S70. Specifically, a mathematical model for use in estimating the residual amount of sulfur in the interior of LNT 8 is stored beforehand in a memory of the ECU 12. In step S70, that model is used to estimate that residual amount of sulfur, and a judgement is made as to whether that residual amount is smaller than a predetermined value. The succeeding step S80 is then executed in accordance with the result of the judgement made in step S70. Hence, if it is judged in step S70 that the residual amount of sulfur in the LNT 8 is smaller than the predetermined value, then this indicates that the S poisoning regeneration can be terminated, so that a YES decision is made in step S80 and step S90 is then executed, to set to the S poisoning regeneration termination flag to the ON state. Otherwise, a NO decision is made in step S580, and this execution of the processing routine (performed at the end of a rich interval, as described above) is ended with the S poisoning regeneration termination flag remaining in the OFF state.

The judgement made in step S70 will be referred to as judgement B.

To perform the judgement B, the amount of sulfur that had become accumulated in the LNT 8 (i.e., in the time period between the end of the preceding regeneration procedure and the start of the current regeneration procedure) are estimated, for example based on cumulative addition of the amounts of fuel that have been consumed by the engine during that time period and the amount of sulfur per unit quantity of fuel. The amounts of that sulfur which have been deoxidized and exited from the LNT 8 during the current regeneration procedure are estimated (based on temperature values of the NOx catalyst, A/F ratio information, etc.) and cumulatively added. Each time that the judgement B is executed, the estimated amount of sulfur that has been removed (deoxidized) is subtracted from the aforementioned estimated accumulated amount of sulfur within the LNT 8, to thereby obtain an estimate of the remaining amount of sulfur within the LNT 8. If that estimated amount is zero or below a predetermined threshold value, then a YES decision is made in step S80, while otherwise, a NO decision is made.

Some examples of the successive measured values AF1(1), AF1(2), AF1(3) etc., obtained in step S10 of FIG. 2 will be described in the following. As described above, these values are obtained successively, during a rich interval. The reason for utilizing a plurality of successive values in this way is that the measured values which are obtained from the upstream A/F sensor 10 and from the downstream A/F sensor 11 at the start of a rich interval may not necessarily accurately reflect the effects of the sulfur compounds upon the deoxidation (reduction) reactions in the LNT 8.

Specifically, immediately following the start of a rich interval, the A/F ratio measured values will tend to be close to the stoichiometric (i.e., logical) A/F ratio. This is due to the fact that following the start of a rich interval, the oxygen that was stored during the preceding lean interval in the material which adsorbs oxygen (in the NOx catalysts) first becomes consumed. When all of that stored oxygen has been consumed, the process advances to the stage of deoxidation of the sulfur compounds that have accumulated in the NOx catalyst of the LNT 8.

For that reason with the present invention, as described in the following referring to specific examples, in addition to obtaining a plurality of sample values of A/F ratio from each of the upstream and downstream A/F ratio sensors 10 and 11, the ECU 12 commences acquiring these A/F ratio samples only after a specific amount of delay has elapsed following the start of a rich interval. It is thereby ensured that all of the A/F ratio sample values are acquired only the deoxidation of the sulfur compounds in the NOx catalyst has commenced. Another reason for providing this delay is that the A/F sensors themselves have response delays.

In the following, sample values of A/F ratio acquired by the ECU 12 from the upstream A/F sensor 10 and the downstream A/F sensor 11 (for the purpose of judging whether to terminate a regeneration procedure) will be respectively referred to as the pre-LNT A/F ratio samples and post-LNT A/F ratio samples.

Figure 6:
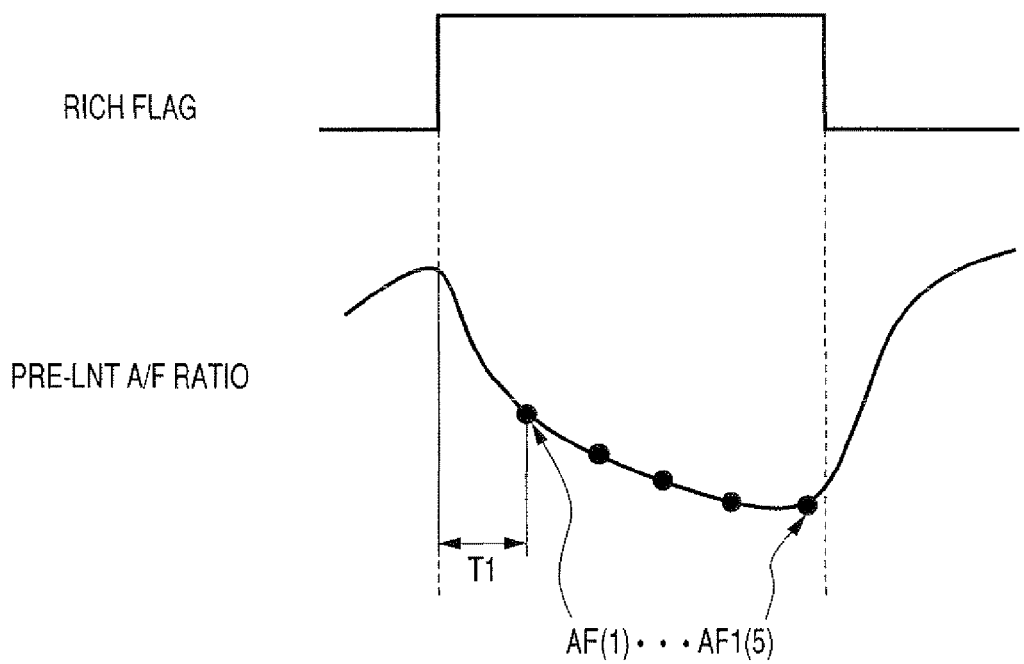
FIGS. 6, 7, 8, 9, 10 and 11 are respective timing diagrams illustrating examples of acquiring A/F ratio sample values for use in judging a time of terminating a sulfur poisoning regeneration procedure.

FIG. 6 shows an example of pre-LNT A/F ratio samples AF1(i) (i=1, 2 . . . ), obtained by successively sampling the pre-LNT A/F ratio during a sampling interval. The sampling interval begins after a predetermined fixed time interval T1 has elapsed following the point at which the rich flag becomes set ON, and ends when the rich flag thereafter returns to the OFF state. In the example of FIG. 6, the A/F ratio samples are from AF1(1) to AF1(5).

Figure 7:
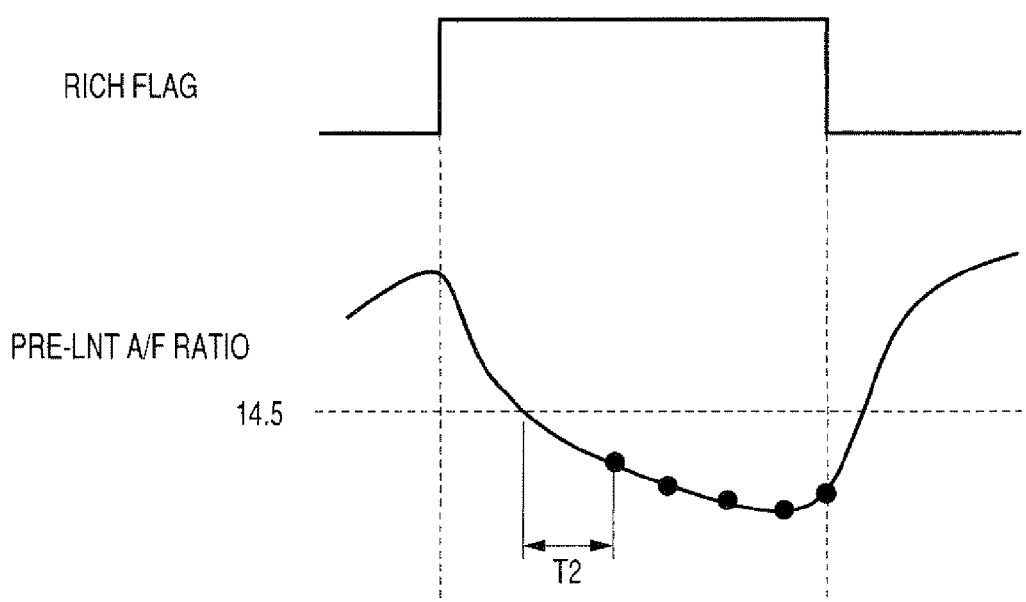

In the example of AF1 values shown in FIG. 7, the measured values are also obtained by successively sampling the pre-LNT A/F ratio values during a specific sampling interval.

In this case, the sampling interval begins after a predetermined fixed time interval T2 has elapsed following the point at which the pre-LNT A/F ratio falls below the logical value of 14.5 and ends when the rich flag thereafter returns to the OFF state.

Figure 8:
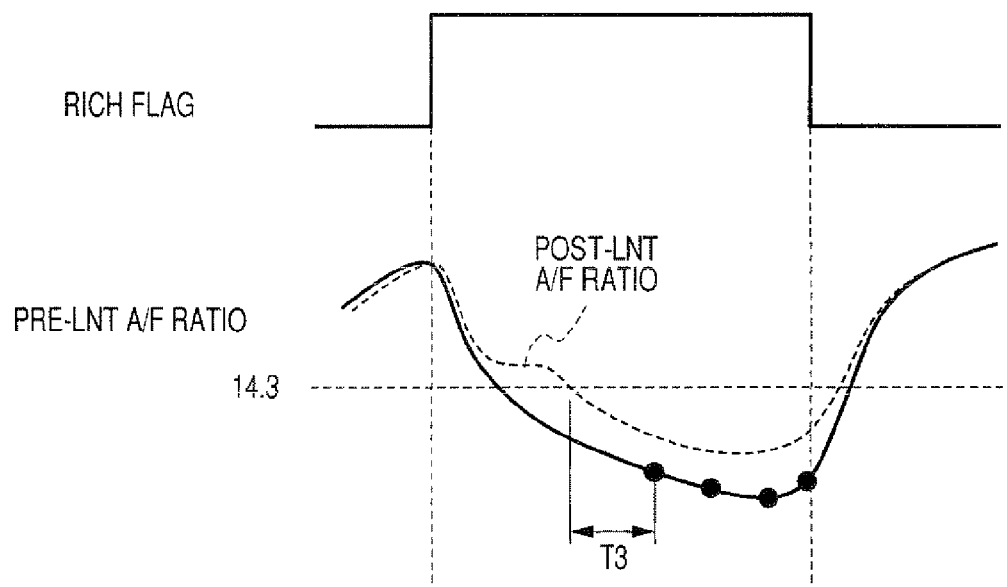

In the example of AF1 values shown in FIG. 8, the measured values are also obtained by sampling the pre-LNT A/F ratio values during a specific sampling interval. In this case, the sampling interval begins after a predetermined fixed time interval T3 has elapsed following the point at which the post-LNT A/F ratio falls below a value (e.g., 14.3) which is less than the post-LNT stoichiometric A/F ratio of 14.5, and the sampling interval ends when the rich flag thereafter returns to the OFF state.

With the above examples, the duration of each sampling interval is not fixed. In the example shown in FIG. 9, after acquisition of the pre-LNT A/F ratio samples has commenced during a rich interval, this is continued for a fixed-duration sampling interval T4. At the end of that interval the rich flag is set to OFF, and acquisition of the sample values is terminated.

Examples will now be described of the measured values which constitute the inputs AF2(i) (i=1, 2 . . . ) of step S10 in FIG. 4. In the example shown in FIG. 10, the AF2 samples are obtained by sampling the post-LNT A/F ratio values during a specific sampling interval. The sampling interval begins after a predetermined fixed time interval T5 has elapsed following the point at which the post-LNT A/F ratio falls below a value (e.g., 14.3) which is less than the logical post-LNT A/F ratio of 14.5, and the sampling interval ends when the rich flag thereafter returns to the OFF state.

Figure 11:
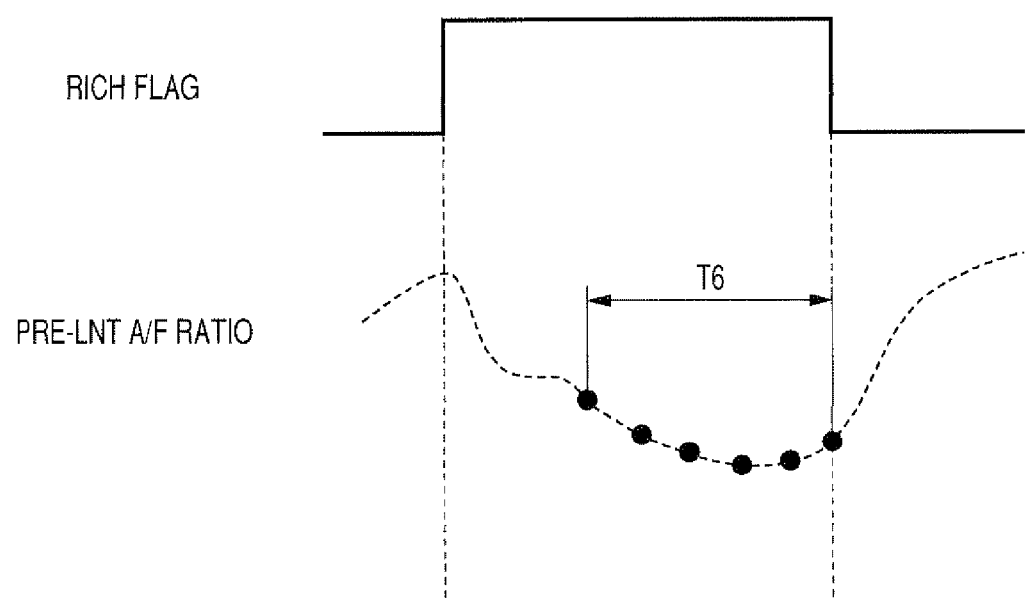

In the example of FIG. 11, after acquisition of the post-LNT A/F ratio samples has been initiated during a rich interval as described above, this is continued for a fixed-duration sampling interval T6. At the end of that interval the rich flag is set to OFF, and acquisition of the samples is terminated.

It can thus be understood that with the present invention, by performing A/F ratio measurements (i.e., taking sample A/F ratio values) only during an interval in which the effects of the deoxidation reaction of the sulfur oxides are reflected in the sample values obtained from the A/F ratio sensors, it becomes possible to accurately judge the point at which to terminate the S poisoning regeneration, with only measured values of A/F ratio being used in making the judgement.

Figure 10:
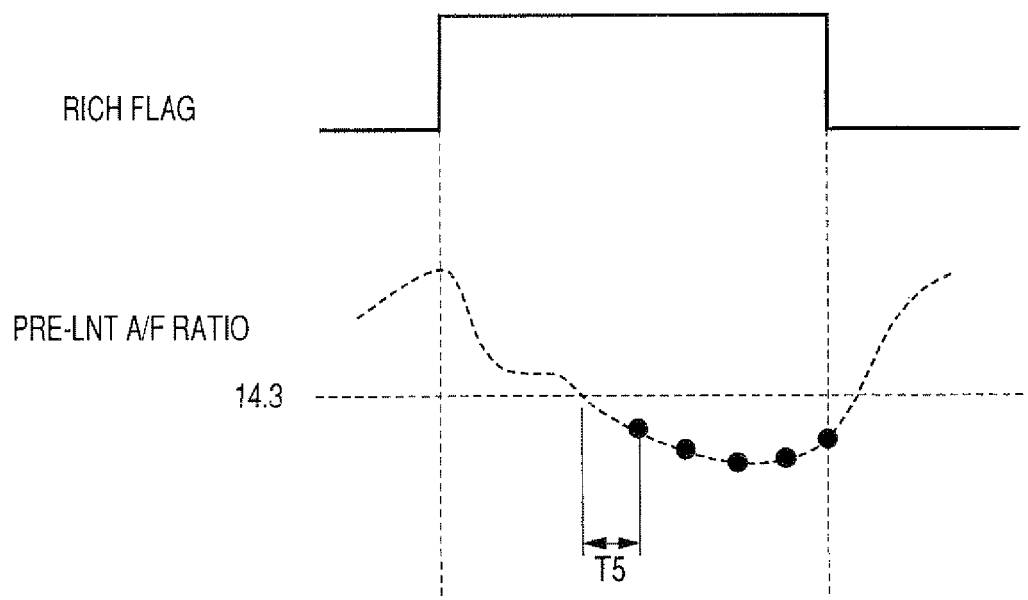

With the measurement methods of FIGS. 7 and 10 or of FIGS. 8 and 10, it is reliably ensured that the pre-LNT A/F ratio samples and post-LNT A/F ratio samples are each obtained after the measured (pre-LNT or post-LNT) A/F ratio has fallen to a sufficiently low value to ensure that the effects of the deoxidation reaction of the sulfur oxides are reflected in the measured A/F ratio values.

Figure 9:
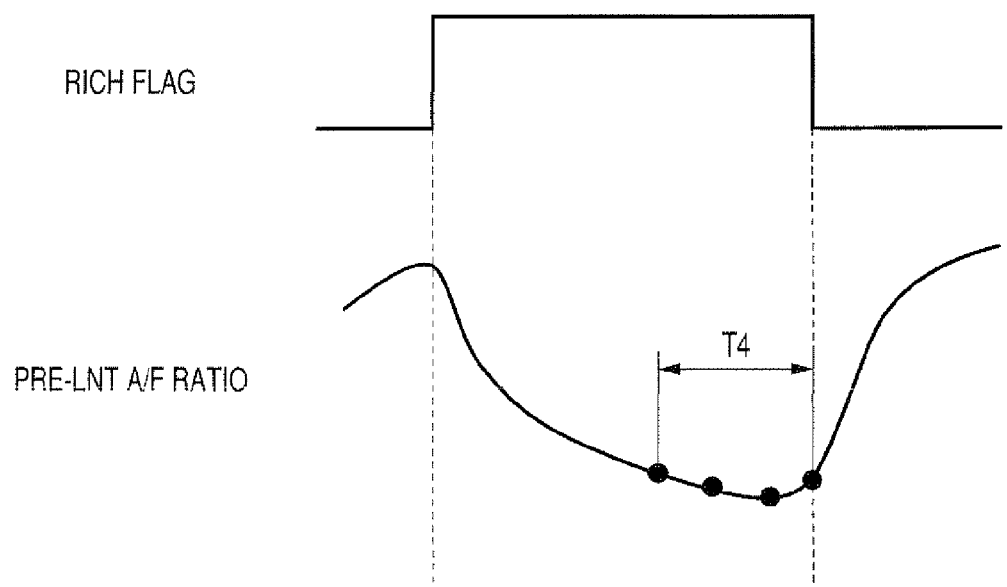

In addition, with the measurement methods of FIGS. 9 and 11, these A/F ratio samples are acquired only during a fixed-duration sampling interval within each rich interval (e.g., with each sampling interval commencing at a time point determined using the above-described methods of FIGS. 7 and 10 or FIGS. 8 and 10). In that way, in addition to ensuring that each sampling interval begins only after a sufficient delay to ensure that the deoxidation reaction of the sulfur oxides within the LNT-8 is already affecting the measured A/F ratio values obtained from the downstream A/F ratio sensor 11, the methods of FIGS. 9 and 10 enable measurement to be simplified, since each sampling interval is of fixed duration.

Next, the calculation of AF1ave in S20 and the calculation of AF2ave in S30 of FIG. 4 will be described referring to some examples. In the following, it will be assumed that I1 AF1 values are measured during a single rich interval. (In the example of FIG. 6, the value of I1 is five). It will also be assumed that I2 AF2 values are measured during a single rich interval. (In the example of FIG. 11, the value of I2 is five).

Firstly, AF1ave can be calculated from the following equation (1) as the average of the values AF1(i) (i=1, 2 . . . ), i.e., $$AF1\text{ave} = \{AF1(1) + AF1(2) + \ldots + AF1(I1)\}/I1 \tag{1}$$

Similarly, AF2ave can be calculated from the following equation (2) as the average of the values AF2(i) (i=1, 2 . . . ), i.e., $$AF2\text{ave} = \{AF2(1) + AF2(2) + \ldots + AF2(I2)\}/I2 \tag{2}$$

Alternatively, it is possible to calculate AF1ave by using a type of equation sometimes referred to as an "annealng" equation, e.g., using the following equations (3), (4) and (5):

$$AF1a(0) = 0 \tag{3}$$

$$AF1a(j) = \{AF1a(j-1) + AF1(j)\}/2 \tag{4}$$

where $j = 1, 2, \ldots, I1$ $$AF1\text{ave} = AF1a(I1) \tag{5}$$

Similarly, it is possible to calculate AF2ave by using the following equations (6), (7) and (8):

$$AF2a(0) = 0 \tag{6}$$

$$AF2a(j) = \{AF2a(j-1) + AF2(j)\}/2 \tag{7}$$

where $j = 1, 2, \ldots, I2$ $$AF2\text{ave} = AF2a(I2) \tag{8}$$

Equations (3) to (8) use so-called "½ annealing", however it would be equally possible to use "¼ annealing". In that case AF1(ave) can be calculated from the following equations (9), (10) and (11):

$$AF1a(0) = 0 \tag{9}$$

$$AF1a(j) = \{3AF1a(j-1) + AF1(j)\}/4 \tag{10}$$

where $j = 1, 2, \ldots, I1$ $$AF1\text{ave} = AF1a(I1). \tag{11}$$

Similarly, it is possible to calculate AF2ave by using the following equations (12), (13) and (14):

$$AF2a(0) = 0 \tag{12}$$

$$AF2a(j) = \{3AF2a(j-1) + AF2(j)\}/4 \tag{13}$$

where $j = 1, 2, \ldots, I2$ $$AF2\text{ave} = AF2a(I2) \tag{14}$$

By using representative values as described above, the effects of variations in the A/F ratio measured values (including sensor errors, etc.) can be reduced. As a result, it becomes possible to accurately judge the point at which to terminate the S poisoning regeneration. If such "annealing" equations are used, this has the advantage that the calculations can be performed repetitively, so that only a small amount of memory capacity is required to execute the calculations.

Figure 3:
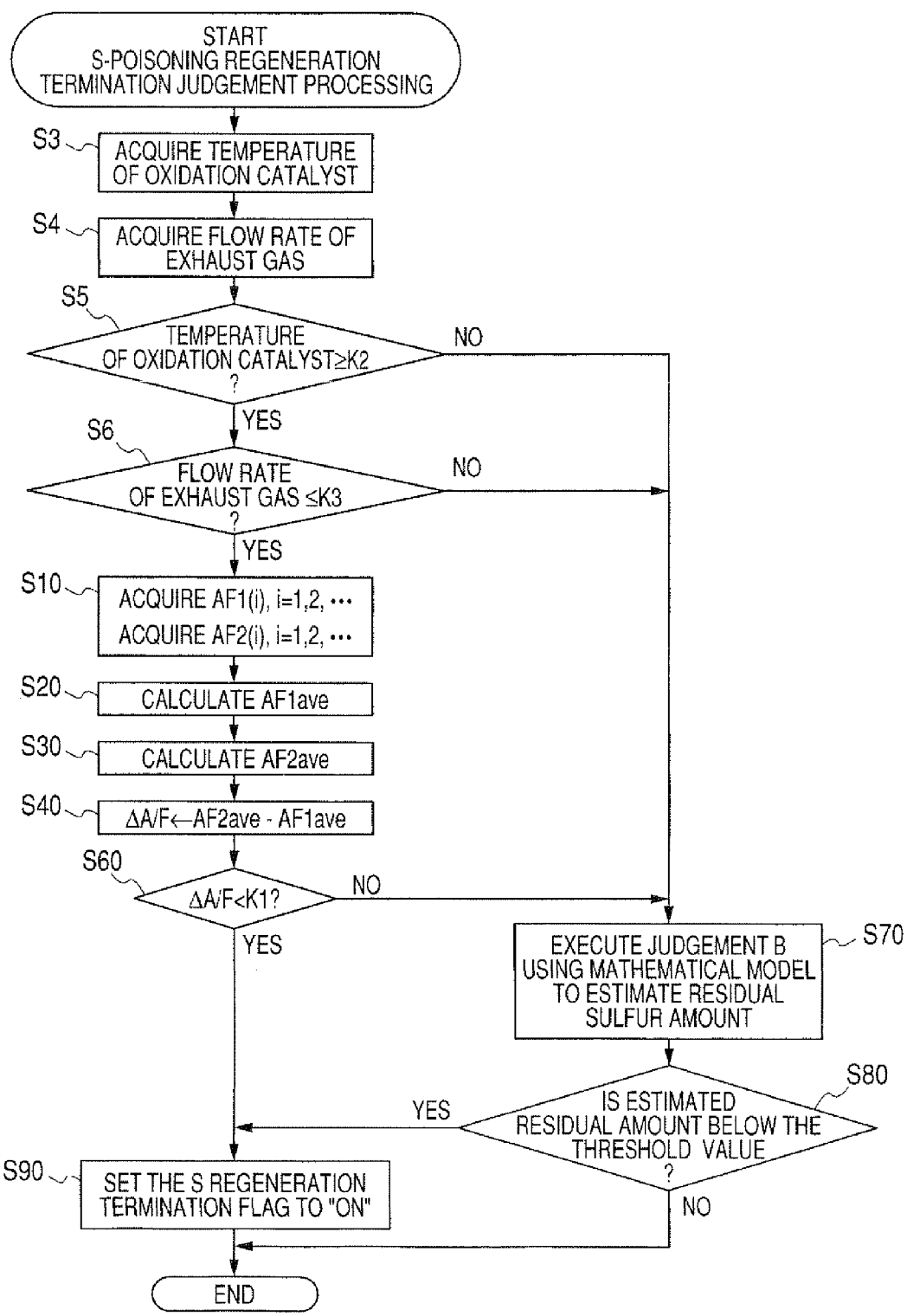
FIG. 3 is a flow diagram of a processing sequence for judging a time point for terminating a sulfur poisoning regeneration procedure, according to a second embodiment.

FIG. 3 is a flow diagram of a second embodiment, which replaces the flow diagram of FIG. 2 of the first embodiment. Other than for the flow diagram, the second embodiment is identical to the first embodiment. With the second embodiment, if the temperature of the oxidizing medium (C-DPF 7) becomes excessively low or the exhaust gas flow rate becomes excessively high, the judgement A (step S60 of FIG. 2) is omitted, and only the judgement step S70 (judgement B) is executed.

The reason for this is that if the temperature of the oxidizing medium (C-DPF 7) becomes excessively low, the reaction for oxidizing hydrocarbons to obtain CO will not be sufficiently advanced, so that HC (hydrocarbons) will pass into the LNT 8 in an unchanged condition. In general, an A/F ratio sensor will readily react to CO, but has a low sensitivity in reacting to HC. Hence, if the temperature of the C-DPF 7 is excessively low, the reliability of measured values obtained from the A/F ratio sensors will be low. Hence in such a case it is preferable to omit the judgement A, which utilizes these measured values.

In addition, if the exhaust gas flow rate is excessively high, then unburned HC (i.e., which have not been sufficiently consumed in the interior of the C-DPF 7) will be passed into the LNT 8 in an unchanged condition. In such a case too, the reliability of measured values obtained from the A/F ratio sensors will be low, so that in the flow diagram of FIG. 3 the judgement A (step S60) is also omitted if the exhaust gas flow rate is excessively high.

The flow diagram of FIG. 3 essentially differs from that of FIG. 2 in that the steps S3, S4, S5 and S6 are added, and the following description will be based on these steps. Firstly in step S3, the temperature of the oxidization catalyst in the C-DPF 7 is acquired. This temperature value can be obtained as an estimated value of the interior temperature of the C-DPF 7, as measured by the exhaust temperature sensor 13 (i.e., the temperature of the exhaust gas exiting from the C-DPF 7). However it would be equally possible to dispose an exhaust gas temperature sensor upstream from the C-DPF 7, and to use the measured value obtained from that sensor as an estimated value of the temperature of the oxidation catalyst of the C-DPF 7.

As a further alternative, it would be possible to provide exhaust gas temperature sensors located respectively upstream and downstream from the C-DPF 7, and to calculate the average of the temperature values obtained from these, with the average value being taken as the internal temperature of the C-DPF 7 (i.e., as the estimated temperature of the oxidation catalyst in the C-DPF 7).

As another alternative, it would be possible to store a computer program for use in estimating the internal temperature of the C-DPF 7, based on respective temperature values measured by exhaust gas temperature sensors that are located respectively upstream and downstream from the C-DPF 7.

Next in the flow diagram of FIG. 3, the exhaust gas flow rate is acquired in step S4. This value can be obtained as (i.e., can be assumed to be identical to) the intake flow rate that is measured by the air flow meter 4. Next in step S5 a decision is made as to whether the temperature of the oxidation catalyst exceeds a predetermined value, designated as K2. If there is a YES decision then operation proceeds to step S6, while if there is a NO decision then step S70 is executed.

Next in step S6 a decision is made as to whether the exhaust gas flow rate is below a predetermined value K3. If the flow rate is below K3 (YES decision) then step S10 is executed, while if the flow rate is equal to or greater than K3 (NO decision) then operation proceeds to step S70.

In that way, if the temperature of the oxidation catalyst is below a predetermined value, or the flow rate of the exhaust gas exceeds a predetermined value, the processing of steps S10 to S60 is skipped, and step S70 is executed. Thus in that case, only the judgement B (based on the residual sulfur estimation model) is used, thereby avoiding the use of A/F ratio measured values having low accuracy, when judging the point at which to terminate the sulfur poisoning regeneration. Hence, increased accuracy of judging that point of termination can be achieved.

Figure 4:
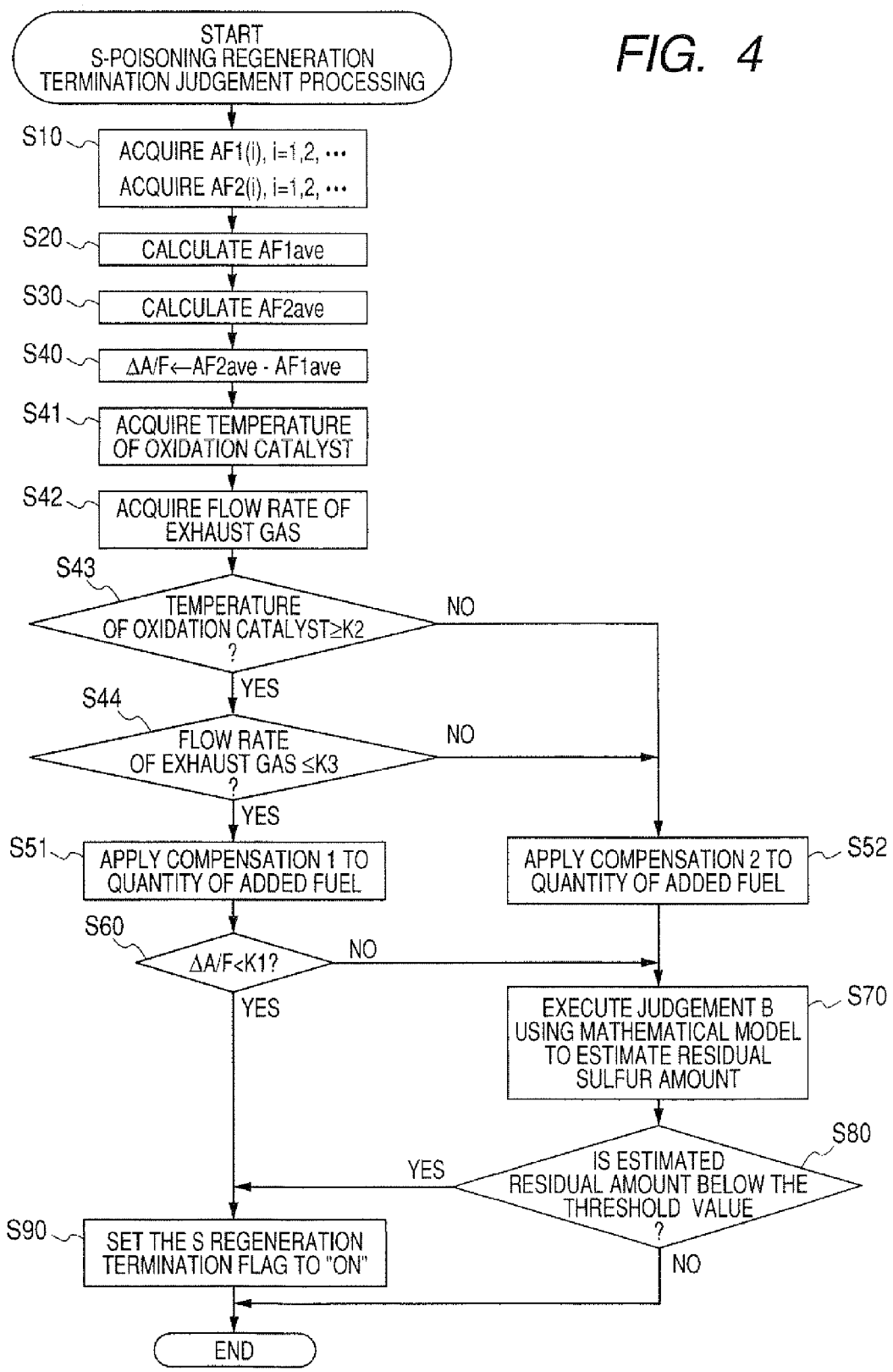
FIG. 4 is a flow diagram of a processing sequence for judging a time point for terminating a sulfur poisoning regeneration procedure, according to a third embodiment.

FIG. 4 is a flow diagram of a third embodiment, which replaces the flow diagram of FIG. 3 of the second embodiment. Other than for the flow diagram, the third embodiment is identical to the second embodiment.

With the second embodiment, if the temperature of the oxidation catalyst is excessively low, or the exhaust gas flow rate is excessively high, then only the judgement B is performed, with judgement A being omitted as described above. However with the third embodiment, in addition to that feature of the second embodiment, compensation is applied to the amount of fuel which is injected into the exhaust gas flow for producing a fuel-enriched atmosphere.

In the following, a condition whereby the temperature of the oxidation catalyst exceeds a predetermined value and also the exhaust gas flow rate is below a predetermined value will be referred to as condition 1, while a condition whereby the temperature of the oxidation catalyst is below a predetermined value and/or the exhaust gas flow rate exceeds a predetermined value will be referred to as condition 2. With the third embodiment, different amounts of compensation are applied to the amount of fuel which is injected into the exhaust gas flow, depending upon whether condition 1 or condition 2 occurs.

By adjusting the amount of fuel that is injected into the exhaust gas flow, a desired A/F ratio can be more accurately determined. Thus the atmosphere in the exhaust system can be made sufficiently rich, while on the other hand it becomes possible to avoid generating harmful substances such as $H_2S$ due to the atmosphere in the exhaust system being made excessively rich.

Furthermore, by applying control such that the A/F ratio becomes close to a predetermined value, variations in the measured values from the A/F ratio sensors can be reduced.

The steps S41, S2, S43, S44 in the flow diagram of FIG. 4 (which immediately follow step S40) are respectively identical to the steps S3, S4, S5, S6 in the flow diagram of FIG. 3. With this embodiment, the values of AF1ave and AF2ave that are obtained in steps S20, S30 respectively are used in step S51 or in step S52 as described hereinafter, following steps S43, S44.

In step S43, in the same way as for step S5 of FIG. 3, a decision is made as to whether the temperature of the oxidation catalyst reaches the predetermined value K2. If the temperature is equal to or greater than K2 (YES decision in step S43) then operation proceeds to step S44, while if the temperature is less than K2 (NO decision) then step S52 is executed.

In step S44, a decision is made as to whether the flow rate of the exhaust gas reaches the predetermined value K3. If the flow rate is equal to or less than K3 (YES decision in step S44)

then step S51 is executed, while if the flow rate is greater than K3 (NO decision), operation proceeds to step S52.

In step S51, the amount of fuel that is added to (injected into) the exhaust gas flow by the fuel addition valve 6 for establishing a rich atmosphere is adjusted such that the measured values obtained from the upstream A/F sensor 10 will be brought to a first predetermined target value, while in step S52 that amount of added fuel is adjusted such that the measured values obtained from the downstream A/F sensor 11 will be brought to a second predetermined target value.

If the processing has advanced to step S51, this signifies that the temperature of the C-DPF 7 is greater than the temperature value K2 while also the exhaust gas flow rate is lower than the flow rate value K3. In such a condition, accurate values of A/F ratio can be obtained from the upstream A/F sensor 10. Hence the amount of fuel to be added to the exhaust gas is adjusted, in step S51, such as to bring the values measured by the upstream A/F sensor 10 (i.e., AF1ave) towards the target value of A/F ratio.

Specifically, if the value of AF1ave was lower than the target value of A/F ratio during the preceding rich interval, then compensation is applied such as to increase the amount of fuel that will be added to the exhaust gas in the next rich interval. Conversely, if the value of AF1ave was higher than the target value during the preceding rich interval, then the compensation is applied to decrease the amount of fuel that will be added to the exhaust gas in the next rich interval.

A suitable value for the target A/F ratio used in step S51 is 14.0.

If the processing has advanced to step S52, this signifies that the temperature of the C-DPF 7 is lower than the predetermined value while also the exhaust gas flow rate is higher than the predetermined value. Hence in such a case, accurate measured values cannot be obtained from the upstream A/F sensor 10. However due to fuel reaction which occurs within the LNT 8, the reliability of the measured values obtained from the downstream A/F sensor 11 will be greater than those from the upstream A/F sensor 10. Thus in step S52, compensation is applied to the amount of fuel that is added to the exhaust gas in a rich interval, such as to make AF2ave (measured values obtained from the downstream A/F sensor 11) coincide with a target value of A/F ratio, i.e., a value that is appropriate for executing the regeneration.

Specifically, with this adjustment, if the value of AF2ave in the preceding rich interval was lower than the target value, the added fuel amount is increased in the succeeding rich interval, while if the value of AF2ave in the preceding rich interval was greater than the target value, the added fuel amount is decreased in the succeeding rich interval.

A suitable value for the target A/F ratio used in step S52 is 14.2, for example.

With the above embodiments, in steps S5, S6 of FIG. 3 and in steps S43, S44 of FIG. 4, a judgement concerning the temperature of the oxidation catalyst (C-DPF 7) and a judgement concerning the exhaust gas flow rate are performed respectively independently of one another. However it would be equally possible to combine these, i.e., to providing a stored memory map having coordinate axes that represent values of oxidation catalyst temperature and values of exhaust gas flow rate respectively. In that case it is only necessary to perform a single judgement, as to whether or not the combination of obtained values of oxidation catalyst temperature and exhaust gas flow rate corresponds to a position within a predetermined region of the map.

The following relationships exist between components of the above embodiments and the contents of the appended claims. The LNT 8 corresponds to a NOx catalyst device. The fuel addition valve 6 corresponds to a catalyst regeneration means. The C-DPF 7 corresponds to a catalyst having an oxidizing function. The C-DPF 7 also corresponds to a particulate filter equipped with an oxidation catalyst. The ECU 12 corresponds to control circuitry.

Although the invention has been described above referring to specific embodiments, it should be understood that various modification and alternative configurations of these can be envisaged, which fall within the scope claimed for the invention as set out in the appended claims.

What is claimed is:

1. An exhaust gas purification apparatus for an internal combustion engine, the apparatus comprising:
   a NOx (nitrous oxides) catalyst device installed in an exhaust passage of said internal combustion engine for deoxidizing NOx contained in an exhaust gas,
   a catalyst regeneration apparatus,
   control circuitry for controlling said catalyst regeneration apparatus to execute regeneration of said NOx catalyst device from sulfur poisoning by reducing an A/F (air-to-fuel) ratio of said exhaust gas to value that is lower than a stoichiometric A/F ratio,
   an upstream A/F ratio sensor for obtaining measured values of A/F ratio of said exhaust gas, disposed in said exhaust gas passage at a location which is upstream from said NOx catalyst device, with respect to a flow direction of said exhaust gas,
   a downstream A/F ratio sensor for obtaining measured values of A/F ratio of said exhaust gas, disposed in said exhaust gas passage at a location which is downstream from said NOx catalyst device,
   a flow rate sensor for detecting a flow rate of said exhaust gas through said exhaust gas passage, and
   a temperature sensor for detecting a temperature of said NOx catalyst device;
   wherein said control circuitry is configured to operate during execution of said regeneration to:
      acquire measured values of A/F ratio from said downstream A/F ratio sensor and said upstream A/F ratio sensor respectively, and
      calculate a difference between said respective A/F ratio values from said upstream A/F ratio sensor and said downstream A/F ratio sensor;
   wherein said control circuitry is configured to:
      compare said difference with a predetermined difference value, attainment of said predetermined difference value corresponding to a condition whereby a residual amount of sulfur contained in said NOx catalyst device attains a predetermined threshold value of residual amount, and
      terminate said regeneration when said difference is judged to be less than said predetermined difference value while also said flow rate of said exhaust gas is lower than a predetermined flow rate value and said temperature of said NOx catalyst device is higher than a predetermined temperature value.

2. An exhaust gas purification apparatus according to claim 1, comprising a catalyst having an oxidizing function, disposed at a location which is upstream from said upstream A/F ratio sensor.

3. An exhaust gas purification apparatus according to claim 2, wherein said catalyst having an oxidizing function comprises a particulate filter equipped with an oxidation catalyst and wherein said particulate filter is configured to collect particulate matter that is conveyed in said exhaust gas.

4. An exhaust gas purification apparatus according to claim 1, wherein said control circuitry is coupled to receive information expressing operating parameters of said internal combustion engine, including cumulative amounts of fuel consumed by said internal combustion engine, and said control circuitry comprises a memory having data stored therein expressing an estimation model for utilizing said operating parameter information to estimate a residual amount of sulfur contained in said NOx catalyst device, and wherein said control circuitry is configured to compare said difference between respective A/F ratio values with said predetermined threshold value of A/F ratio, as a first judgment operation, apply said estimation model to obtain an estimated residual amount of sulfur, when said difference between respective A/F ratio values is judged to exceed said first predetermined value, compare said estimated residual amount of sulfur with a predetermined threshold value of residual amount, as a second judgment operation, and terminate said regeneration when said estimated residual amount is judged to be less than said threshold value of residual amount.

5. An exhaust gas purification apparatus according to claim 1, wherein said catalyst regeneration apparatus is controlled to add a specific quantity of fuel to said exhaust gas during said regeneration, for producing said fuel-enriched condition of said exhaust gas, and said control circuitry is configured to adjust said specific quantity in a direction for bringing values of A/F ratio obtained by said upstream A/F ratio sensor close to a target value of A/F ratio.

6. An exhaust gas purification apparatus according to claim 2, comprising a temperature sensor for acquiring a temperature value of said catalyst having an oxidizing function, wherein said control circuitry is configured to calculate said difference between respective A/F ratio values from said upstream A/F ratio sensor and said downstream A/F ratio sensor only under a condition that said acquired temperature value of said NOx catalyst device exceeds said predetermined temperature value.

7. An exhaust gas purification apparatus according to claim 2, comprising a temperature sensor for acquiring a temperature value of said catalyst having an oxidizing function, and wherein said catalyst regeneration apparatus is controlled to add a specific quantity of fuel into said exhaust gas during said regeneration, for producing a fuel-enriched condition of said exhaust gas;

wherein said control circuitry is configured:

to be responsive to a condition in which said exhaust gas temperature value exceeds a predetermined threshold value for adjusting said specific quantity in a direction whereby values of A/F ratio obtained by said upstream A/F ratio sensor become close to a first target value, and to be responsive to a condition in which said exhaust gas temperature value is less than said predetermined threshold value for adjusting said specific quantity in a direction whereby values of A/F ratio obtained by said downstream A/F ratio sensor become close to a second target value.

8. An exhaust gas purification apparatus according to claim 7, wherein said control circuitry is coupled to receive information expressing operating parameters of said internal combustion engine, including cumulative amounts of fuel consumed by said internal combustion engine, and said control circuitry comprises a memory having data stored therein expressing an estimation model for utilizing said operating parameter information to estimate a residual amount of sulfur contained in said NOx catalyst device, and wherein said control circuitry is configured to:

compare said difference between respective A/F ratio values with a predetermined threshold value of A/F ratio, as a first judgment operation, apply said estimation model to obtain an estimated residual amount of sulfur, when said difference between respective A/F ratio values is judged to exceed said first predetermined value, compare said estimated residual amount of sulfur with said predetermined threshold value of residual amount, as a second judgement operation, and terminate said regeneration when said estimated residual amount is judged to be less than said threshold value of residual amount.

9. An exhaust gas purification apparatus according to claim 1, wherein said control circuitry is configured to calculate said difference between respective A/F ratio values from said upstream A/F ratio sensor and said downstream A/F ratio sensor only under a condition that said flow rate of said exhaust gas exceeds said predetermined flow rate value.

10. An exhaust gas purification apparatus according to claim 1, wherein said catalyst regeneration apparatus is controlled to inject a specific quantity of fuel into said exhaust gas during said regeneration, for producing a fuel-enriched condition of said exhaust gas;

wherein said control circuitry is configured:

to be responsive to a condition in which said flow rate of said exhaust gas exceeds said predetermined flow rate value for adjusting said specific quantity in a direction whereby values of A/F ratio obtained by said upstream A/F ratio sensor become close to a first target value, and to be responsive to a condition in which said flow rate of said exhaust gas is less than said predetermined flow rate value for adjusting said specific quantity in a direction whereby values of A/F ratio obtained by said downstream A/F ratio sensor become close to a second target value.

11. An exhaust gas purification apparatus according to claim 10, wherein said control circuitry is coupled to receive information expressing operating parameters of said internal combustion engine, including cumulative amounts of fuel consumed by said internal combustion engine, and said control circuitry comprises a memory having data stored therein expressing an estimation model for utilizing said operating parameter information to estimate a residual amount of sulfur contained in said NOx catalyst device, and wherein said control circuitry is configured to compare said difference between respective A/F ratio values with a predetermined threshold value of A/F ratio, as a first judgement operation, apply said estimation model to obtain an estimated residual amount of sulfur, when said difference between respective A/F ratio values is judged to exceed said first predetermined value, compare said estimated residual amount of sulfur with said predetermined threshold value of residual amount, as a second judgement operation, and terminate said regeneration when said estimated residual amount is judged to be less than said threshold value of residual amount.

12. An exhaust gas purification apparatus according to claim 1, wherein
said control circuitry is configured to control said regeneration apparatus for establishing said fuel-rich condition only during each of a succession of fixed-duration intervals while said regeneration is in progress, and
in each of said fixed-duration intervals, said control circuitry acquires said A/F ratio values after a specific delay has elapsed following a commencement of said interval.

13. An exhaust gas purification apparatus according to claim 12, wherein said specific delay has a predetermined fixed value.

14. An exhaust gas purification apparatus according to claim 12, wherein said specific delay is the sum of a first interval and a second interval, where
said first interval extends from said commencement until a point at which A/F ratio values obtained from a predetermined one of said upstream A/F ratio sensor and said downstream A/F ratio sensor attain a stoichiometric A/F ratio, and
said second interval has a predetermined fixed duration.

15. An exhaust gas purification apparatus according to claim 1, wherein said control circuitry is configured to
acquire a plurality of sample values of measured A/F ratio from said upstream A/F ratio sensor during execution of said regeneration, with said acquisition commencing after a first delay following a commencement of said regeneration, and derive a representative upstream A/F ratio based on said plurality of sample values from the upstream A/F ratio sensor,
acquire a plurality of successive sample values of measured A/F ratio values obtained from said downstream A/F ratio sensor during execution of said regeneration, with said acquisition commencing after a second delay following said commencement of regeneration, and derive a representative downstream A/F ratio based on said plurality of sample values from the downstream A/F ratio sensor,
calculate a representative difference as a difference between said representative upstream A/F ratio and said representative downstream A/F ratio,
compare said representative difference with a predetermined representative difference threshold value, and
terminate said regeneration when said representative difference is judged to be less than said representative difference threshold value.

16. An exhaust gas purification apparatus according to claim 15, wherein said first delay is a predetermined fixed-duration interval.

17. An exhaust gas purification apparatus according to claim 15, wherein said first delay extends from a point at which said A/F ratio measured by said upstream A/F ratio sensor becomes less than a stoichiometric A/F ratio until a predetermined fixed-duration interval has elapsed.

18. An exhaust gas purification apparatus according to claim 15, wherein said first delay extends from a point at which said A/F ratio measured by said downstream A/F ratio sensor becomes less than a stoichiometric A/F ratio value until a predetermined fixed-duration interval has elapsed.

19. An exhaust gas purification apparatus according to claim 15, wherein said sample values of A/F ratio from said upstream A/F ratio sensor are acquired during an interval having a predetermined fixed duration.

20. An exhaust gas purification apparatus according to claim 15, wherein said second delay extends from a point at which said A/F ratio measured by said downstream A/F ratio sensor becomes less than a stoichiometric A/F ratio until a predetermined fixed-duration interval has elapsed.

21. An exhaust gas purification apparatus according to claim 15, wherein said sample values of A/F ratio from said downstream A/F ratio sensor are acquired during an interval having a predetermined fixed duration.

22. An exhaust gas purification apparatus according to claim 15, wherein said representative upstream A/F ratio is calculated as an average of said plurality of sample values from the upstream A/F ratio sensor and said representative downstream A/F ratio is calculated as an average of said plurality of sample values from the downstream A/F ratio sensor.

23. An exhaust gas purification apparatus according to claim 1, wherein said control circuitry is configured to execute said regeneration by controlling said catalyst regeneration apparatus to increase a proportion of fuel in said exhaust gas during each of a plurality of successive fuel-rich intervals, and, during each of said fuel-rich intervals, to:
acquire a plurality of sample values of measured A/F ratio from said upstream A/F ratio sensor, with said acquisition commencing after a first delay following a commencement of said fuel-rich interval, and derive a representative upstream A/F ratio based on said plurality of sample values from the upstream A/F ratio sensor,
acquire a plurality of successive sample values of measured A/F ratio values obtained from said downstream A/F ratio sensor, with said acquisition commencing after a second delay following said commencement of the fuel-rich interval, and derive a representative downstream A/F ratio based on said plurality of sample values from the downstream A/F ratio sensor,
calculate a representative difference as a difference between said representative upstream A/F ratio and said representative downstream A/F ratio,
compare said representative difference with a predetermined representative difference threshold value, and
terminate said regeneration when said representative difference is judged to be less than said representative difference threshold value.

24. An exhaust gas purification apparatus according to claim 23, wherein said first delay is a predetermined fixed-duration interval.

25. An exhaust gas purification apparatus according to claim 23, wherein said first delay extends from a point at which said A/F ratio measured by said upstream A/F ratio sensor becomes less than a stoichiometric A/F ratio until a first predetermined fixed-duration interval has elapsed, and said second delay extends from a point at which said A/F ratio measured by said downstream A/F ratio sensor becomes less than said stoichiometric A/F ratio until a second predetermined fixed-duration interval has elapsed.

* * * * *

UNITED STATES PATENT AND TRADEMARK OFFICE
CERTIFICATE OF CORRECTION

PATENT NO. : 8,307,633 B2
APPLICATION NO. : 12/177911
DATED : November 13, 2012
INVENTOR(S) : Kojima et al.

It is certified that error appears in the above-identified patent and that said Letters Patent is hereby corrected as shown below:

On the title page Item (54) Title should read:

ENGINE EXHAUST GAS PURIFICATION APPARATUS ENABLING ACCURATE JUDGEMENT OF APPROPRIATE TIME FOR TERMINATING NOx CATALYST REGENERATION PROCEDURE

Signed and Sealed this
Eighteenth Day of December, 2012

David J. Kappos
*Director of the United States Patent and Trademark Office*

UNITED STATES PATENT AND TRADEMARK OFFICE
CERTIFICATE OF CORRECTION

PATENT NO. : 8,307,633 B2  Page 1 of 1
APPLICATION NO. : 12/177911
DATED : November 13, 2012
INVENTOR(S) : Kojima et al.

It is certified that error appears in the above-identified patent and that said Letters Patent is hereby corrected as shown below:

On the title page Item (54) and at Column 1, lines 1-5, Title should read:

--ENGINE EXHAUST GAS PURIFICATION APPARATUS ENABLING ACCURATE JUDGEMENT OF APPROPRIATE TIME FOR TERMINATING NOx CATALYST REGENERATION PROCEDURE--.

This certificate supersedes the Certificate of Correction issued December 18, 2012.

Signed and Sealed this
Nineteenth Day of February, 2013

Teresa Stanek Rea
*Acting Director of the United States Patent and Trademark Office*